United States Patent
Sumiyashiki

(10) Patent No.: US 6,527,214 B2
(45) Date of Patent: Mar. 4, 2003

(54) WEBBING RETRACTOR

(75) Inventor: Akira Sumiyashiki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/899,564

(22) Filed: Jul. 6, 2001

(65) Prior Publication Data

US 2002/0005448 A1 Jan. 17, 2002

(30) Foreign Application Priority Data

Jul. 11, 2000 (JP) .................................... 2000-210534

(51) Int. Cl.⁷ .............................................. B60R 22/38
(52) U.S. Cl. ................................ 242/383.2; 242/384.2
(58) Field of Search .......................... 242/383.2, 384.2, 242/384.5, 384.6; 280/806; 297/478

(56) References Cited

U.S. PATENT DOCUMENTS 4,369,932 A * 1/1983 Seifert et al. ............ 242/384.6
5,441,209 A * 8/1995 Fujimura et al. ......... 242/384.5
5,480,105 A * 1/1996 Fujimura et al. ......... 242/384.5
5,484,118 A 1/1996 Fujimura et al.

FOREIGN PATENT DOCUMENTS

| DE | 199 01 143 | 5/2000 |
| JP | 5-246303 | 9/1993 |

OTHER PUBLICATIONS

European Search Report, Nov. 19, 2001.

* cited by examiner

*Primary Examiner*—William A. Rivera
(74) *Attorney, Agent, or Firm*—Nixon Peabody LLP; Thomas W. Cole

(57) ABSTRACT

At a lock plate of a webbing retractor, a pair of pawls and a connecting shaft are molded integrally such that the lock plate is rotated appropriately such that the connecting shaft of the lock plate is inserted into a spool from a cut-out portion and two operational surfaces oppose respective load receiving surfaces, and thereafter, other parts are assembled.

19 Claims, 6 Drawing Sheets

WEBBING RETRACTOR

BACKGROUND OF THE INVENTION

1. Field of the Invention

The present invention relates to a webbing retractor, and in particular, to a webbing retractor which can impede rotation of a spool in a webbing pull-out direction at a time when a vehicle rapidly decelerates or at a time when the webbing is rapidly pulled-out.

2. Description of the Related Art

Generally, in a webbing retractor, a webbing is wound in a roll form on a hollow cylindrical spool supported at a frame which is formed in a substantial U-shape as seen in plan view and which is fixed to a vehicle. Usually, the webbing can be freely taken-up or pulled-out due to the spool rotating freely. Further, in the webbing retractor, a WSIR (webbing sensitive inertia reel) or a VSIR (vehicle sensitive inertia reel) is utilized in order to impede pulling-out of the webbing when a rapid deceleration of the vehicle or a rapid pulling-out of the webbing is sensed.

A WSIR or VSIR is equipped with a lock function to impede rotation of the spool in the webbing pull-out direction, in order to impede pulling-out of the webbing in the above-described cases. An example of such a lock mechanism is the lock mechanism disclosed in Japanese Patent Application (JP-A) No. 5-246303 in which a main pawl and a back-up pawl (lock plate) are disposed at the both sides of a reel shaft (spool), and due to the main pawl and the back-up pawl engaging with teeth (lock teeth) formed at a frame, rotation of the reel shaft in the webbing pull-out direction is impeded. In such a conventional lock mechanism, rotation of the reel shaft in the webbing pull-out direction can be reliably impeded in predetermined cases, and the webbing retractor can be made lighter-weight (e.g., the main pawl and the back-up pawl can be made thinner) because the load at the time of locking is dispersed at the main pawl and the back-up pawl which are provided at the both sides of the reel shaft.

In the above-described conventional webbing retractor, when placing the main pawl and the back-up pawl at the both ends of the reel shaft, in a state in which the main pawl is inserted into one end of a joint pin, the joint pin is inserted into a through hole formed in the spool. Further, in this state, the back-up pawl is mounted to the other end portion of the joint pin. Namely, at the time that three parts which are the joint pin, the main pawl and the back-up pawl are assembled to the spool, they are connected so as to be interlocking.

Thus, the workability in assembling the main pawl and the back-up pawl to the reel shaft is poor. Moreover, the number of parts forming the lock mechanism is large, and accordingly, there is the problem that the number of assembly processes is large.

SUMMARY OF THE INVENTION

In view of the above circumstances, an object of the present invention is to provide a webbing retractor in which the structure of a lock plate can be simplified, it is easy to assemble a lock plate to a spool, and workability is improved.

In order to achieve the above object, a webbing retractor relating to the present invention comprises: a spool which is tube-shaped and on which a webbing is taken-up and from which the webbing is pulled-out; a cut-out portion formed over an entire length of an outer surface of the spool along a rotational axis of the spool, a bottom portion of the cut-out portion being circular-arc-shaped; a frame which is fixed and held at a vehicle, and which rotatably supports the spool between a pair of leg pieces, and at which lock teeth are formed at an inner surface of an opening of each leg piece; and a lock plate having a pair of pawls formed so as to be engageable with the lock teeth, and a connecting shaft which has a circular cross-section and which connects the pair of pawls, and due to the connecting shaft being inserted into and disposed in the cut-out portion, the pair of pawls are disposed so as to oppose the lock teeth at both end portions of the spool, and in a predetermined case, due to due to the pair of pawls engaging with the lock teeth, the lock plate impedes rotation of the spool in a webbing pull-out direction.

In the above-described webbing retractor, usually, the lock plate is disposed so as to oppose the lock teeth, and the lock plate and the lock teeth are in anon-engaged state. Thus, rotation of the spool is not limited, and the webbing can be freely taken-up and pulled-out.

On the other hand, in a predetermined case such as, for example, at a time when the vehicle rapidly decelerates or the webbing is rapidly pulled-out, the lock plate, which is provided with the pair of pawls disposed at the both end portions of the spool, engages with the lock teeth formed at the pair of leg pieces forming the frame, and rotation of the spool in the webbing pull-out direction is thereby hindered.

Here, when the lock plate, which is provided with the pair of pawls disposed at the both end portions of the spool, is assembled to the spool, first, the pawls are connected to the both ends of the connecting shaft, and the lock plate is formed as a single part. When the lock plate is formed, the connecting shaft is inserted into the spool from the opening, along the spool rotating shaft, of the cut-out portion which is formed along the entire length of the outer surface of the spool. When the connecting shaft is inserted into the spool, due to the lock plate being appropriately rotated around the connecting shaft, the lock plate is disposed at a predetermined position. In this state, other parts, such as a V gear forming a WSIR or a VSIR, or the like, are assembled.

In this way, in the webbing retractor of the present invention, there is no need to mount a pawl in the state in which a connecting shaft is inserted into a through hole of a spool, as in the conventional art. By inserting the connecting shaft of the lock plate, which is a single part, into the spool from the cut-out portion, the lock plate can be assembled to the spool. Thus, the structure of the lock plate can be simplified, the assembly of the lock plate to the spool is easy, and workability improves.

In the webbing retractor relating to the present invention, preferably, at the lock plate, the pair of pawls and the connecting shaft are formed integrally.

In this webbing retractor, the lock plate, which has the pair of pawls and the connecting shaft, is formed integrally (integrally molded) as a single part in a part machining step. Thus, at the time when the lock plate is assembled to the spool, there is no need to connect the pawls to the both ends of the connecting shaft. As a result, when assembling the lock plate to the spool, it suffices to insert the connecting shaft of the lock plate, which is a single part, into the spool from the cut-out portion of the spool, and to rotate the lock plate appropriately.

Further, because the lock plate is molded integrally, there are no limits on the configuration accompanying the formation of the portions which connect the pawls and the connecting shaft. Thus, the degrees of freedom of the shape (design) of the lock plate can be increased. Moreover, the dimensional precision of the lock plate is provided by the precision of machining alone, and there is no need to consider the precision of assembly. Thus, constant dimensional precision can easily be obtained.

In this way, in the preferable webbing retractor of the present invention, the structure of the lock plate can be simplified even more, the assembly of the lock plate to the spool can be simplified even more, and workability improves.

DESCRIPTION OF THE PREFERRED EMBODIMENTS

A webbing retractor 10 relating to an embodiment of the present invention will be described on the basis of FIGS. 1 through 6.

Figure 1:
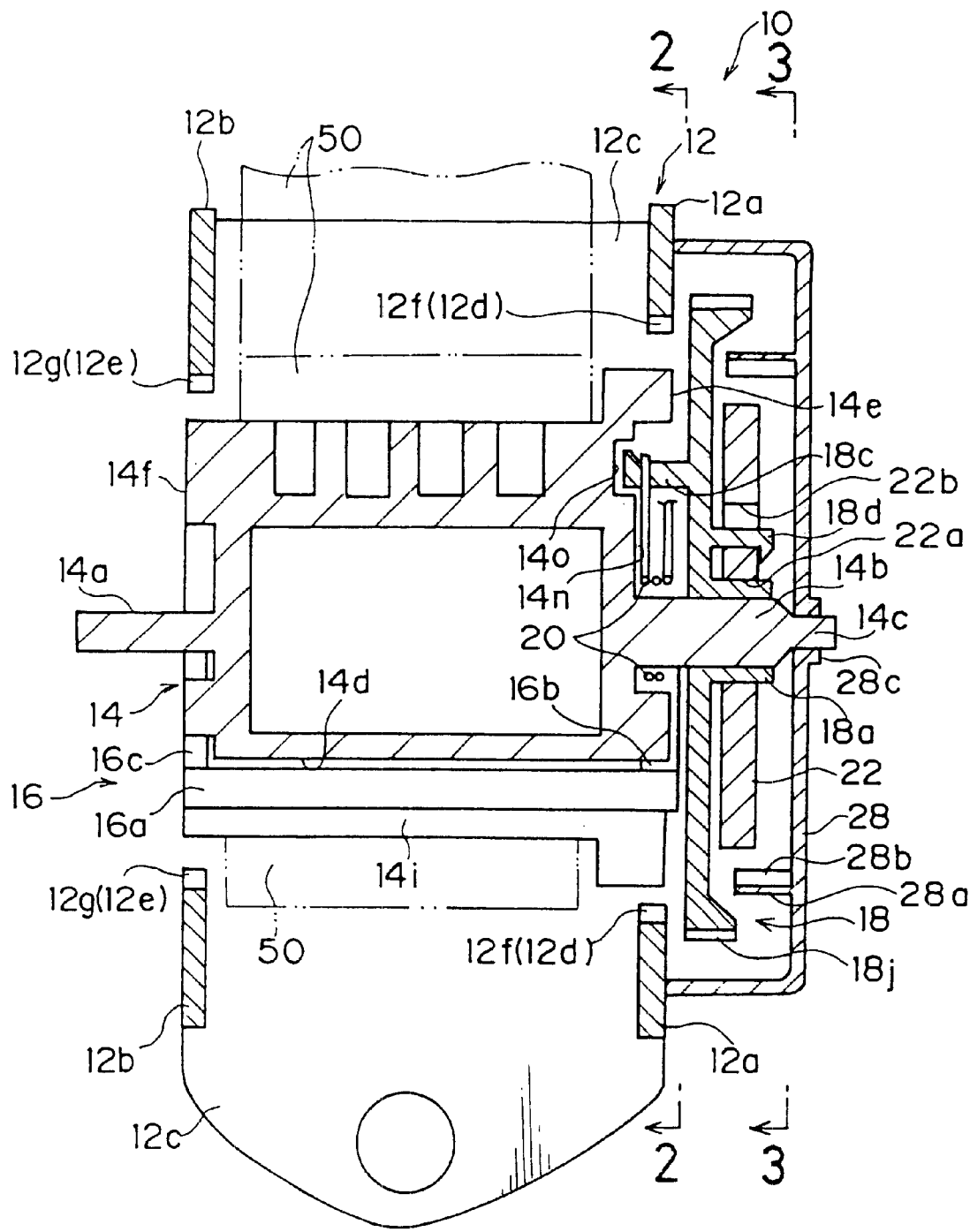
FIG. 1 is a schematic sectional view showing an overall structure of a webbing retractor relating to an embodiment of the present invention.
Figure 2:
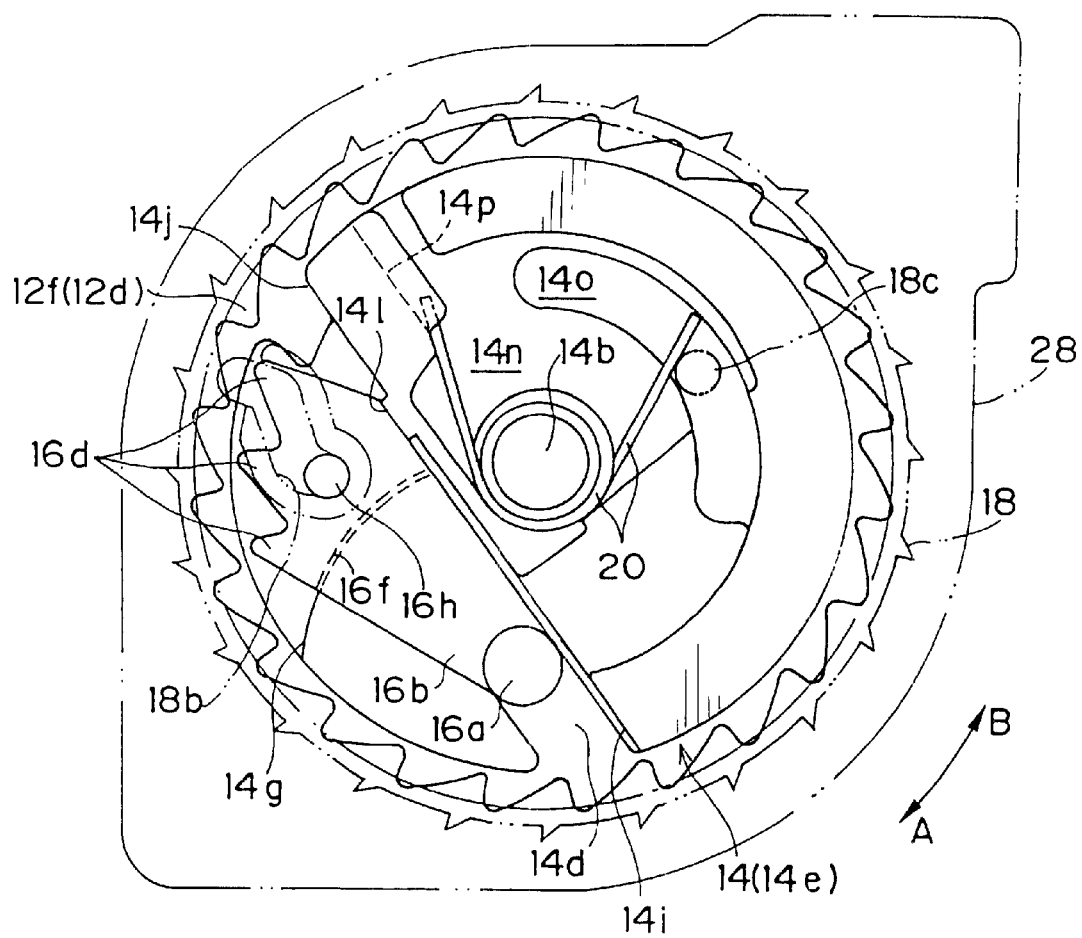
FIG. 2 is a side view, as seen from direction 2—2 in FIG. 1, showing an unlocked state of the webbing retractor relating to the embodiment of the present invention.
Figure 3:
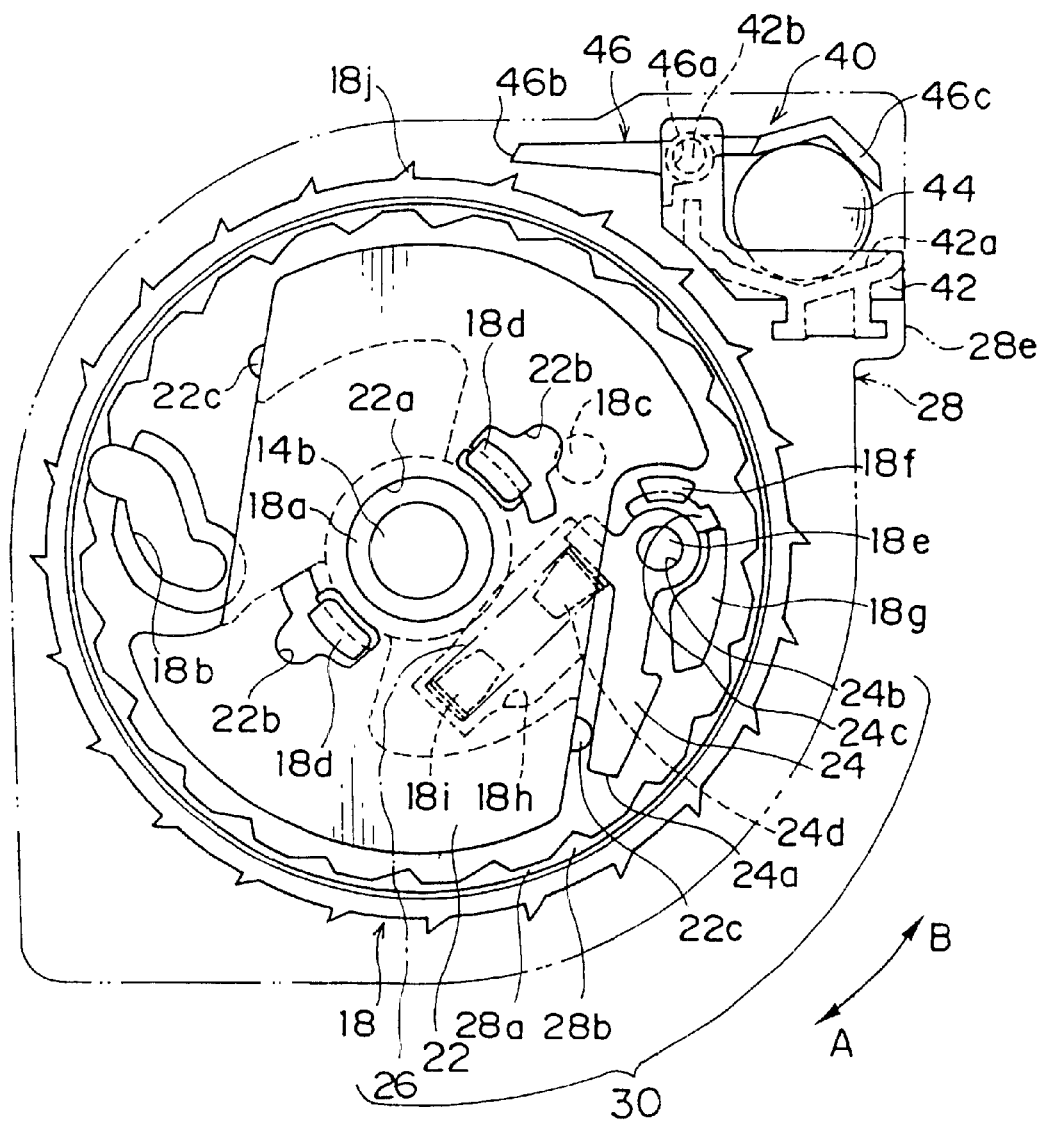
FIG. 3 is a side view, as seen from direction 3—3 in FIG. 1; showing a non-operating state of a W sensor 30 which forms the webbing retractor relating to the embodiment of the present invention.

In FIG. 1, an overall structure of the webbing retractor 10 relating to the present embodiment is illustrated in cross-section. In FIGS. 2 and 3, the webbing retractor 10 as seen from the directions of C—C and D—D in FIG. 1 is shown in side view. When direction A and direction B are shown in FIGS. 1 through 6, direction A indicates a webbing pull-out direction, and direction B indicates a webbing take-up direction.

As shown in FIG. 1, the webbing retractor 10 has a frame 12. The frame 12 has a pair of opposing leg pieces 12a, 12b, and a back piece 12c which connects the leg pieces 12a, 12b. The frame 12 is thereby formed in a substantial U-shape as seen in plan view. The back piece 12c extends downward, and the lower end portion thereof is fastened and fixed by bolts to a vehicle body.

Internal ratchets 12d, 12e which serve as lock teeth are formed by punching in the leg pieces 12a, 12b of the frame 12. Ratchet teeth 12f, 12g of the internal ratchets 12d, 12e are set to have high strength.

A hollow cylindrical spool 14, whose axial direction is the direction in which the leg pieces 12a, 12b oppose one another, is provided between the opposing leg pieces 12a, 12b of the frame 12. A rotation shaft 14a is formed integrally with one end portion of the spool 14. A power spring (not shown) is connected to the distal end portion of the rotation shaft 14a, such that the spool 14 is rotatably supported in a state of always being urged to rotate in direction B (see FIG. 2). On the other hand, a rotation shaft 14b is formed integrally with the other end portion of the spool 14. A small diameter shaft 14c, whose diameter is small, is formed integrally at the distal end of the rotation shaft 14b. The spool 14 is rotatably supported at the small diameter shaft 14c by a bearing portion 28c of a sensor holder 28 which will be described later. Further, one end of a webbing 50 is anchored on the spool 14. Due the spool 14 rotating, the webbing 50 is freely taken-up onto and pulled-out from the spool 14.

Figure 4A:
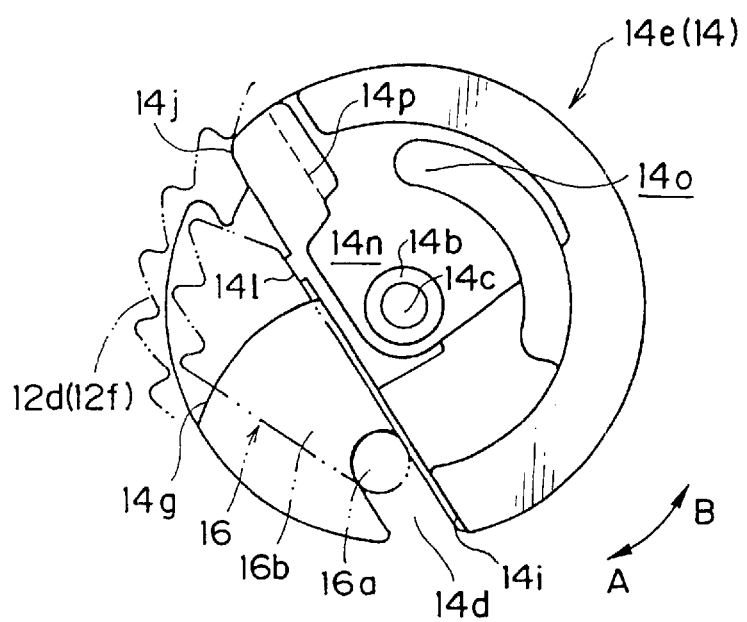
FIG. 4A is a right side view showing a spool which forms the webbing retractor relating to the embodiment of the present invention.
Figure 4B:
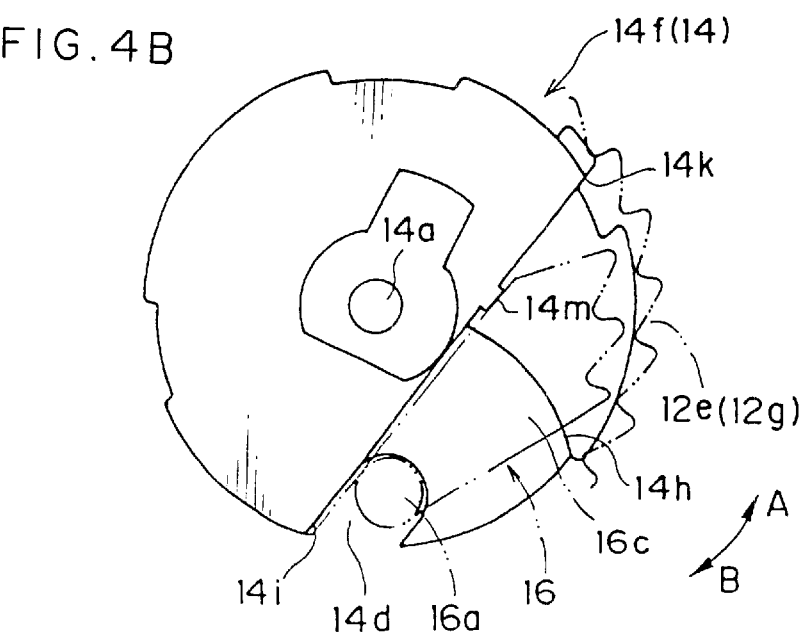
FIG. 4B is a left side view showing the spool which forms the webbing retractor relating to the embodiment of the present invention.
Figure 5:
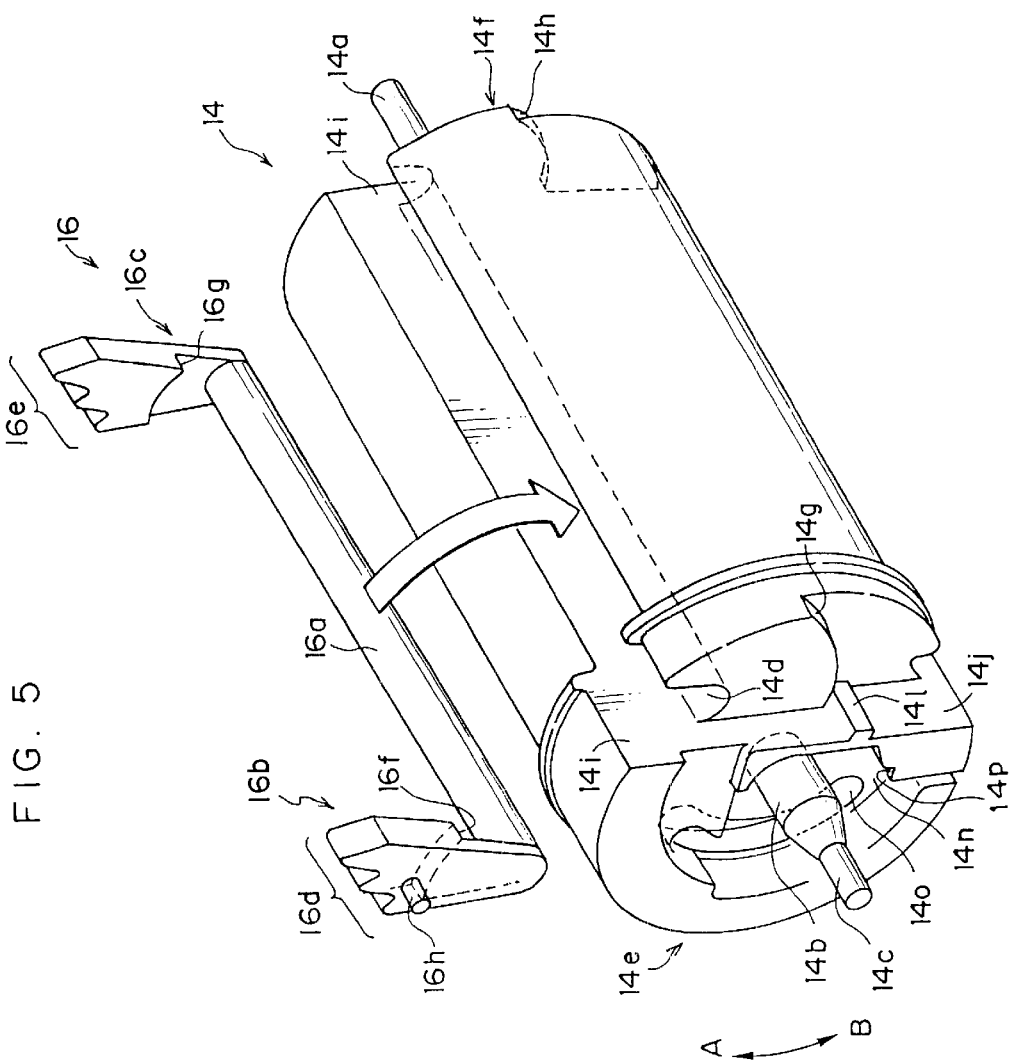
FIG. 5 is a perspective view illustrating the spool and a lock plate which form the webbing retractor relating to the embodiment of the present invention.

As shown in FIGS. 4A, 4B and 5, a cut-out portion 14d is formed at the outer surface of the spool 14. The cut-out portion 14d is separated by a predetermined distance from a center line of end surfaces 14e, 14f of the spool 14, and is formed along the entire length of the spool 14 except for the portions at which the rotation shafts 14a, 14b and the small diameter shaft 14c are formed. The bottom portion of the cut-out portion 14d is formed as a semicircular arc (see FIG. 5 for example). Further, load receiving surfaces 14g, 14h are formed at the end surfaces 14e, 14f of the spool 14, respectively. The load receiving surfaces 14g, 14h are each formed by a circular arc which is concentric with the semicircular arc of the bottom portion of the cut-out portion 14d and by a step in the axial direction of the spool 14 which is formed lower at the outer side of this circular arc. Step portions 14j, 14k are formed in the end surfaces 14e, 14f of the spool 14 along a wall surface 14i at the rotating shaft 14a, 14b sides of the cut-out portion 14d. The rotating shaft 14a, 14b sides of the step portions 14j, 14k are formed to be higher than the upper portions of the load receiving surfaces 14g, 14h. Abutment portions 14l, 14m are formed at the further sides of the load receiving surfaces 14g, 14h as seen from the cut-out portion 14d.

A first concave portion 14n is formed around the rotation shaft 14b of the end surface 14e of the spool 14. A second concave portion 14o, which is formed in a circular arc shape concentric with the rotation shaft 14b, is formed in the first concave portion 14n. A spring receiving portion 14p is formed at one portion of the wall surface forming the first concave portion 14n.

As shown in FIGS. 2 and 5, a connecting shaft 16a of a lock plate 16 is swingably inserted into the cut-out portion 14d of the spool 14. The connecting shaft 16a is formed as a solid cylinder having a smaller diameter than the circular arc of the bottom portion of the cut-out portion 14d of the spool 14. Pawls 16b, 16c are connected to end portions of the connecting shaft 16a. Lock claws 16d, 16e, which can engage with the ratchet teeth 12f, 12g of the frame 12, are formed at the distal end portions of the pawls 16b, 16c. The distal end portions of the pawls 16b, 16c, including the lock claws 16d, 16e, are formed to be thick toward the inner side of the lock plate 16. At the step portions at the boundaries between these thick and thin portions, operation surfaces 16f, 16g are formed. The operation surfaces 16f, 16g are formed from circular arcs which are concentric with the connecting shaft 16a and which have the same diameters as the load receiving surfaces 14g, 14h of the spool 14.

The pawls 16b, 16c are disposed along the end surfaces 14e, 14f of the spool in a state in which the operation surfaces 16f, 16g oppose the load receiving surfaces 14g, 14h of the spool 14 and the lock claws 16d, 16e oppose the internal ratchets 12d, 12e of the frame 12 at the inner sides thereof. In this way, when the pawl 16b and the pawl 16c are slid (guided) in direction B relative to the spool 14, the lock claws 16*d*, 16*e* can engage (self-lock) with the ratchet teeth 12*f*, 12*g*. At the time of engagement of the lock plate 16 with the internal ratchets 12*d*, 12*e*, due to the operation surfaces 16*f*, 16*g* abutting the load receiving surfaces 14*g*, 14*h*, the load applied to the lock plate 16 is supported by the spool 14, and the lock plate 16 can be prevented from falling out from the spool 14. Further, the range of swinging of the lock plate 16 is limited due to the lock plate 16 abutting the abutment portions 14*l*, 14*m* of the spool 14.

A guide pin 16*h* is formed at the pawl 16*b* of the lock plate 16. The guide pin 16*h* is formed as a solid cylindrical projection, and stands erect at the side of the pawl 16*b* which side, as seen from the connecting shaft 16*a*, is further ahead of the operation surface 16*f* and is at the side opposite the side at which the spool 14 is provided.

The lock plate 16 is formed from an aluminum zinc alloy, and is molded integrally by die casting (i.e., is machined as a single part).

As shown in FIG. 3, a V gear 18 is provided at the outer side of the leg piece 12*a* of the frame 12. The V gear 18 is formed substantially as a disc having a larger diameter than the end surface 14*e* of the spool 14. A hollow cylindrical boss 18*a* is formed at the axially central portion of the V gear 18. The rotation shaft 14*b* of the spool 14 is inserted into the boss 18*a* such that the V gear 18 is rotatably supported coaxially with the spool 14. A substantially backward-S-shaped guide hole 18*b* is formed in the V gear 18. The guide pin 16*h* which stands at the pawl 16*b* of the lock plate 16 is inserted into the guide hole 18*b*. In this way, when relative rotation arises between the spool 14 and the V gear 18, the guide hole 18*b* guides the lock plate 16, via the guide pin 16*h*, to a position at which the lock plate 16 can engage with the internal ratchets 12*d*, 12*e* (i.e., swings the lock plate 16 in direction B relative to the spool 14).

Figure 6:
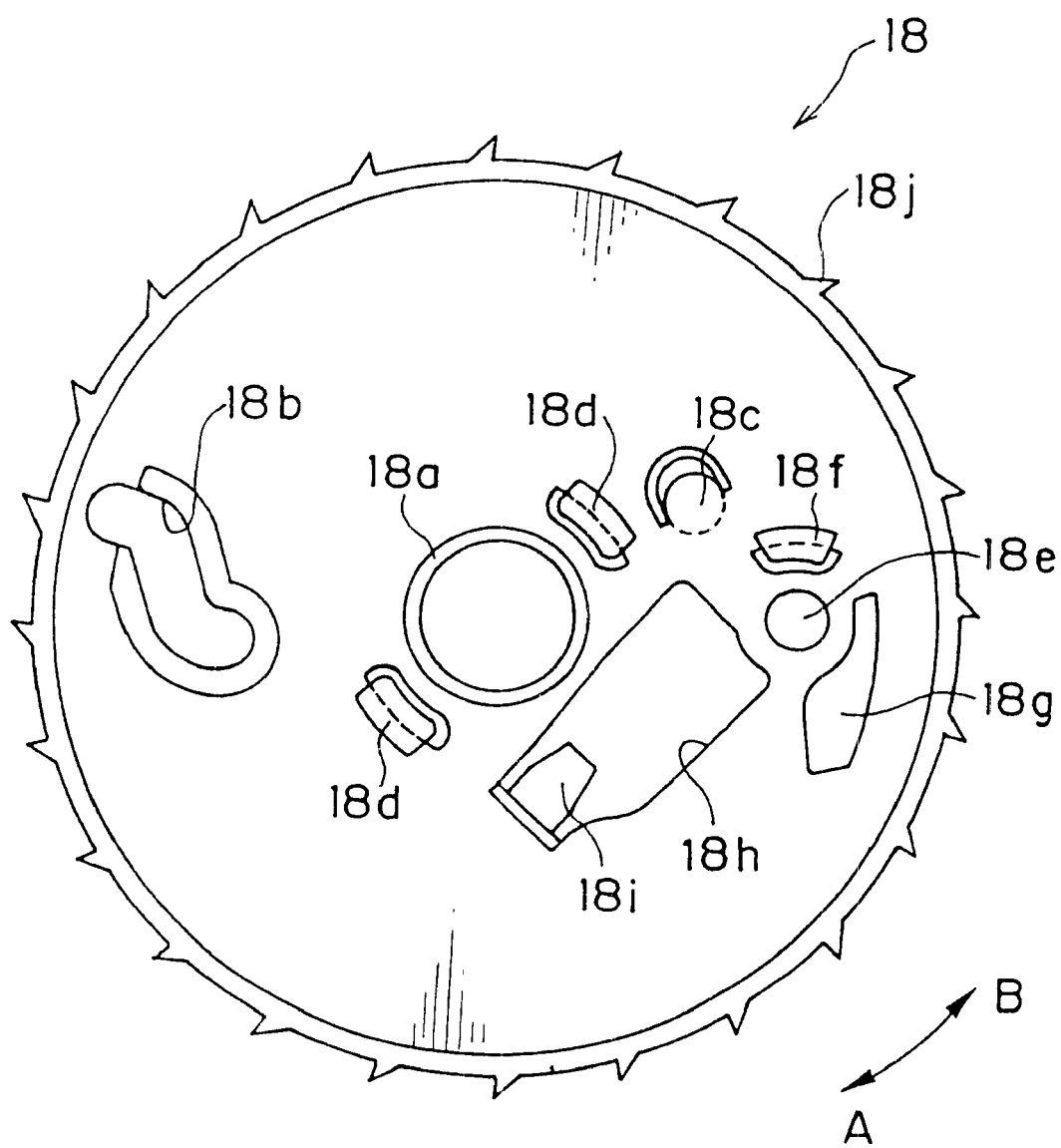
FIG. 6 is a plan view showing a V gear which forms the webbing retractor relating to the embodiment of the present invention.

Further, as shown in FIG. 6, a supporting projection 18*c* is provided at the spool 14 side surface of the V gear 18. The distal end portion of the supporting projection 18*c* is inserted into the second concave portion 14*o* provided at the end surface 14*e* of the spool 14. One end portion of a return spring 20, which is a torsion coil spring, engages with the supporting projection 18*c*. The return spring 20 is disposed within the first concave portion 14*n* around the rotation shaft 14*b*, in a state in which the other end portion of the return spring 20 is engaged with the spring receiving portion 14*p* of the spool 14. In this way, the lock plate 16 is urged in direction A with respect to the spool 14, via the guide pin 16*h*, the V gear 18 (the guide hole 18*b*), and the return spring 20. Usually, the lock plate 16 abuts the abutment portions 14*l*, 14*m* of the spool 14, so as to not obstruct rotation of the spool 14. In this way, the V gear 18 as well usually rotates integrally with the spool 14.

Anchor portions 18*d* are provided at the surface of the V gear 18 at the side opposite the spool 14 side. The anchor portions 18*d* are, as seen in plan view, formed in circular arc shapes which are coaxial with the boss 18*a*, and are disposed at two locations which are symmetrical with respect to the boss 18*a*. A supporting shaft 18*e* is provided at the anchor portion 18*d* side surface of the V gear 18. The supporting shaft 18*e* is formed in a solid cylindrical shape, and is disposed at a position which is substantially symmetrical, around the boss 18*a*, to the guide hole 18*b*. A sensor anchor portion 18*f*, which is formed in a circular arc shape which is concentric with the supporting shaft 18*e* as seen in plan view, is formed in a vicinity of the supporting shaft 18*e* at the same side surface of the V gear 18. A stopper 18*g*, which corresponds to the configuration of a sensor pawl 24 which will be described later, is formed in a vicinity of the supporting shaft 18*e* and the sensor anchor portion 18*f*. A spring hole 18*h* is provided in the V gear 18. A spring receiving portion 18*i* is formed at the end surface of the spring hole 18*h* which end surface substantially opposes the supporting shaft 18*e*.

A plurality of external teeth 18*j* are formed at uniform intervals in the outer peripheral portion of the V gear 18. The external teeth 18*j* are formed so as to be engageable with a sensor lever 46 of a V sensor 40 which will be described later.

As shown in FIGS. 1 and 3, an inertia plate 22 is provided at the side of the V gear 18 opposite the spool 14 side. The inertia plate 22 is formed as a disc from which two peripheral portions, which are symmetrical with respect to the axis of rotation, have been cut out. A support hole 22*a* is formed in the axially central portion of the inertia plate 22. Anchor holes 22*b*, which are formed in circular arc shapes which are concentric with the support hole 22 as seen in plan view, are formed at two positions in the inertia plate 22 which are symmetrical with respect to the support hole 22*a*. The support hole 22*a* and the anchor holes 22*b* correspond to the boss 18*a* and the anchor portions 18*d* of the V gear 18. The boss 18*a* is inserted into the support hole 22*a*, and the anchor portions 18*d* are inserted into the anchor holes 22*b*. The anchor portions 18*d* engage with the inner peripheral portions of the anchor holes 22*b*, and the inertia plate 22 is supported so as to be coaxial with the V gear 18 (the spool 14), and so as to be swingable, and so as to not fall off. Further, the circular arc of the anchor hole 22*b* is formed to be longer (to have a greater angle of circumference) than the circular arc of the anchor portion 18*d*. The inertia plate 22 is disposed so as to be able to swing in direction B with respect to the V gear 18, in a range of the difference between the lengths (the angles of circumference) of these circular arcs. Further, engagement projections 22*c* are formed at the surfaces opposing direction A, at the cut-out portions of the inertia plate 22.

The sensor pawl 24 is connected to the supporting shaft 18*e* of the V gear 18. The sensor pawl 24 includes a distal end portion 24*a* which engages with internal teeth 28*b* formed at the sensor holder 28 which will be described later; a shaft hole 24*b* into which the supporting shaft 18*e* is inserted; an anchor projection 24*c* which anchors on the sensor anchor portion 18*f*; and a spring receiving portion 24*d*.

As shown in FIG. 3, the sensor pawl 24 is swingably supported at the side surface of the V gear 18 in a state in which the support shaft 18*e* of the V gear 18 is inserted into the shaft hole 24*b*. In this state, the anchor projection 24*c* is anchored on the sensor anchor portion 18*f* such that the sensor pawl 24 can be prevented from falling off. Further, the range of swinging of the sensor pawl 24 is limited by the stopper 18*g* which corresponds to the configuration of the sensor pawl 24. Moreover, the spring receiving portion 24*d* of the sensor pawl 24 is inserted into one end portion of a coil spring 26. The coil spring 26 is held within the spring hole 18*h* of the V gear 18 in a state in which the spring receiving portion 18*i* of the V gear 18 is inserted into the other end portion of the coil spring 26. In this state, the sensor pawl 24 is engaged with the engagement projection 22*c* of the inertia plate 22. Thus, the sensor pawl 24 and the inertia plate 22 are urged in direction A with respect to the V gear 18, and usually rotate (revolve around the rotation shaft 14*b*) integrally with the V gear 18 without swinging.

The sensor holder 28 is fixed and held at the outer side of the leg piece 12*a* of the frame 12. The sensor holder 28 is formed in a substantial cap shape, and is fixed and held at the outer side of the leg piece 12a in a state in which the opening portion thereof opposes the leg piece 12a and in which the V gear 18, the inertia plate 22, the sensor pawl 24, and the like are accommodated within the interior thereof. A hollow cylindrical portion 28a is formed at the inner portion of the sensor holder 28. The internal teeth 28b are formed at the inner surface of the cylindrical portion 28a. The internal teeth 28b are disposed at the outer side of the sensor pawl 24. When the sensor pawl 24 swings in direction B relative to the V gear 18, the internal teeth 28b can engage with the distal end portion 24a of the sensor pawl 24.

In the above-described structure, the inertia plate 22, the sensor pawl 24, the coil spring 26, and the internal teeth 28b form a W sensor 30 which forms a WSIR.

The bearing portion 28c is provided at the axially central portion of the sensor holder 28. As described above, the bearing portion 28c rotatably supports the small diameter shaft 14c of the spool 14.

A holder portion 28e is formed integrally with the outer peripheral portion of the sensor holder 28. The V sensor (acceleration sensor) 40, which together with the external teeth 18j of the V gear 18 forms a VSIR, is provided in the holder portion 28e. Note that the V sensor 40 is not shown in FIG. 1.

As shown in FIG. 3, the V sensor 40 has a housing 42, and the housing 42 is fixed and held at a holder portion 28e of the sensor holder 28. A bottom surface 42a, which is V-shaped and has a shallow bottom, is formed at the housing 42. A ball 44 is placed on the bottom surface 42a. The sensor lever 46 is connected to the housing 42. The sensor lever 46 is supported at the housing 42 so as to be freely swingable, by a support shaft 42b provided at the housing 42 being inserted into a shaft hole 46a provided at a substantially central portion of the sensor lever 46. The sensor lever 46 includes a distal end portion 46b which can engage with the external teeth 18j of the V gear 18, and an abutment portion 46c which is formed at the side of the shaft hole 46a opposite the side at which the distal end portion 46b is provided and whose inertial moment is greater than that of the distal end portion 46b. The abutment portion 46c abuts and is set on the ball 44. In this state, the distal end portion 46b is, due to gravity, positioned at a position of non-engagement with the external teeth 18j of the V gear 18. In this way, at the V sensor 40, the non-engaged state of the distal end portion 46b and the external teeth 18j of the V gear 18 is usually maintained due to gravity. At the time of rapid deceleration of the vehicle, due to the ball 44 rolling on a seat surface 44a, the sensor lever 46 swings, such that the distal end portion 46b moves to a position of engagement with the external teeth 18j of the V gear 18.

Next, operation of the present embodiment will be described.

In the webbing retractor 10 having the above-described structure, the spool 14 is supported so as to be freely rotatable, and the lock plate 16 and the V gear 18 are urged in the webbing pull-out direction (direction A) by the return spring 20. Thus, usually, the spool 14, the lock plate 16, and the V gear 18 rotate integrally. Further, usually, the sensor pawl 24 of the W sensor 30 is urged in direction A by the coil spring 26, and the sensor lever 42 of the V sensor 40 is held on the ball 46 due to gravity. Thus, the W sensor 30 and the V sensor 40 do not operate. Therefore, usually, the webbing 50 can be freely taken-up and pulled-out.

On the other hand, at the time of a sudden deceleration of the vehicle, the V sensor 40 operates, the sensor lever 46 engages the external tooth 18j of the V gear 18, and rotation of the V gear 18 in direction A is impeded.

Further, at the time when the webbing 50 is rapidly pulled-out, the W sensor 30 operates, and the sensor pawl 24 engages with the internal tooth 28b of the sensor holder 28 which is fixed to the frame 12, and rotation of the V gear 18 in direction A is impeded.

When rotation of the V gear in direction A is impeded in either of these cases, together with the rotation of the spool 14 in direction A, the lock plate 16 is guided to a position at which engagement with the internal ratchets 12d, 12e is possible. As the spool 14 rotates further in direction A, the lock plate 16 self-locks with the internal ratchets 12d, 12e, and rotation of the spool 14 in direction A is impeded. Further, accompanying this self-locking, operation of the V sensor 40 or the w sensor 30 is cancelled. After the locking of the lock plate 16 and the internal ratchets 12d, 12e is released, the webbing 50 can again be pulled-out (the spool 14 can again rotate in direction A).

Here, at the time of assembling the lock plate 16, at which the connecting shaft 16a and the pawls 16b, 16c (including the lock claws 16d, 16e, the operation surfaces 16f, 16g and the guide pin 16h) are molded integrally, to the spool 14, the lock plate 16 (the connecting shaft 16a) is inserted into the spool 14, with the connecting shaft 16a being inserted first, from the opening, along the spool rotational axis, of the cut-out portion 14d which is formed along the entire length of the outer surface of the spool 14. When the connecting shaft 16a is inserted into the spool, by rotating the lock plate 16 appropriately around the connecting shaft 16a such that the operation surfaces 16f, 16g oppose the load receiving surfaces 14g, 14h of the spool 14, the lock plate 16 is positioned at a predetermined position (the position at which the pawls 16b, 16c abut the abutment portions 14l, 14m of the spool 14). Thereafter, in this state, the other parts, such as the V gear 18 and the like, are assembled.

Thus, there is no need to mount a pawl to a connecting shaft in the state in which the connecting shaft is inserted into a through-hole of a spool, as in the conventional art. By inserting the connecting shaft 16a of the lock plate 16, which is a single part, into the spool 14 from the cut-out portion 14d, the lock plate 16 can be assembled to the spool 14. Further, the operation surfaces 16f, 16g of the lock plate are disposed so as to oppose and so as to be able to abut the load receiving surfaces 14g, 14h of the spool 14. Thus, the lock plate 16 can be prevented from falling out from the spool 14.

Further, the lock plate 16 is molded integrally as a single part by die casting. Thus, there is no need to assemble the connecting shaft 16a and the pawls 16b, 16c, and there is no need for processes for assembling the lock plate 16. Further, because the lock plate 16 is molded integrally, there are no limits on the configuration (design) accompanying the formation of the portions connecting the connecting shaft 16a and the pawls 16b, 16c, and the degrees of freedom of the configuration of the lock plate 16 can be increased. Moreover, the dimensional precision of the lock plate 16 is provided by the precision of machining alone, and there is no need to consider the precision of assembly. Thus, constant dimensional accuracy can be obtained easily.

In this way, in the webbing retractor 10 relating to the present embodiment, the structure of the lock plate 16 can be simplified, the lock plate 16 can easily be assembled to the spool 14, and the workability is improved.

Further in the present embodiment, the lock plate 16 is formed from an aluminum zinc alloy, and is molded integrally by die casting. However, the present invention is not limited to the same, and the material and method of molding the lock plate can be appropriately selected. Further, formation of the lock plate is not limited to integral molding, and for example, the lock plate may be assembled as a single part by welding or the like before being assembled to the spool.

In the webbing retractor 10 relating to the above-described embodiment, pulling-out of the webbing is impeded in predetermined cases. However, the present invention is not limited to the same, and a various mechanisms may be added. Accordingly, for example, a pretensioner mechanism, in which the vehicle occupant is restrained by taking-up the webbing by a given amount at the time of a rapid deceleration of the vehicle, or a force limiter mechanism, which, after pulling-out of the webbing is impeded, permits the webbing to be pulled-out by a predetermined amount and absorbs energy, or the like may be added. In this case, the lock plate is not limited to a structure which is directly set at the spool. For example, the lock plate may be connected to the spool via a lock base which is connected to a torsion bar and which is provided with a cut-out portion corresponding to the cut-out portion of the spool.

Moreover, in the above-described embodiment, the webbing retractor 10 is structured to include both the W sensor 30, which senses rapid pulling-out of the webbing and impedes rotation of the V gear 18 in direction A, and the V sensor 40, which senses rapid deceleration of the vehicle and impedes rotation of the V gear 18 in direction A. However, the present invention is not limited to the same, and may be structured so as to include only one of the W sensor 30 and the V sensor 40. Further, the structures of the W sensor and the V sensor are not limited to the structures of the above-described W sensor 30 and V sensor 40.

As described above, in the webbing retractor relating to the present invention, excellent effects are achieved in that the assembling of the lock plate to the spool is easy, workability is improved, and the number of structural parts of the lock plate can be reduced.

What is claimed is:

1. A webbing retractor comprising:
    a spool which is tube-shaped and on which a webbing is taken-up and from which the webbing is pulled-out;
    a radially oriented cut-out portion formed over substantially an entire length of an outer surface of the spool along a rotational axis of the spool;
    a frame which is fixed and held at a vehicle, and which rotatably supports the spool between a pair of leg pieces, and at which lock teeth are formed at an inner surface of an opening of each leg piece; and
    a lock plate having a pair of pawls formed so as to be engageable with the lock teeth, and a connecting shaft which connects the pair of pawls, said connecting shaft being receivable within and disposed within the cut-out portion such that the pair of pawls are positioned in opposition to the lock teeth at both end portions of the spool, and in a predetermined case, due to the pair of pawls engaging with the lock teeth; the lock plate impedes rotation of the spool in a webbing pull-out direction.

2. A webbing retractor according to claim 1, wherein, at the lock plate, the pair of pawls and the connecting shaft are formed in one piece, the connecting shaft having a circular cross section and the cut-out portion having an arcuate bottom portion for receiving and pivotally mounting said shaft.

3. A webbing retractor according to claim 2, wherein the lock plate is integrally molded by die casting.

4. A webbing retractor according to claim 3, further comprising a gear formed substantially as a disc whose diameter is larger than a diameter of one end surface of the spool, the gear being provided at an outer side of one of the leg pieces of the frame.

5. A webbing retractor according to claim 4, further comprising at least one sensor for controlling operation of the webbing retractor.

6. A webbing retractor according to claim 5, wherein the sensor is a webbing sensor, and the webbing sensor is accommodated within a holder provided at an outer side of one of the leg pieces of the frame.

7. A webbing retractor according to claim 4, wherein the webbing sensor includes an inertia plate provided at a side of the gear opposite the side at which the spool is disposed, so as to be supported coaxially with the gear and swingably; a pawl which is connected to a supporting shaft of the gear and which is swingable at a side surface of the gear; a spring held in a hole formed in the gear; and internal teeth formed at an inner portion of the holder.

8. A webbing retractor according to claim 4, further comprising an acceleration sensor, wherein the acceleration sensor is accommodated within a housing fixed to one portion of the holder of the webbing sensor.

9. A webbing retractor according to claim 8, wherein the acceleration sensor includes a ball placed on a bottom surface of the housing, and a lever which is swingably supported at the housing, and the lever includes a first end portion which is engageable with external teeth of the gear, and a second end portion which can abut an upper portion of the ball.

10. A webbing retractor according to claim 2, wherein the lock plate is assembled as a single part by welding.

11. A webbing retractor according to claim 2, further comprising a gear formed substantially as a disc whose diameter is larger than a diameter of one end surface of the spool, the gear being provided at an outer side of one of the leg pieces of the frame.

12. A webbing retractor according to claim 1, further comprising a gear formed substantially as a disc whose diameter is larger than a diameter of one end surface of the spool, the gear being provided at an outer side of one of the leg pieces of the frame.

13. A webbing retractor according to claim 12, further comprising at least one sensor for controlling operation of the webbing retractor.

14. A webbing retractor comprising:
    a spool which is tube-shaped and on which a webbing is taken-up and from which the webbing is pulled-out;
    a radially oriented cut-out portion formed over substantially an entire length of an outer surface of the spool along a rotational axis of the spool, a bottom portion of the cut-out portion being circular-arc-shaped;
    a frame which is fixed and held at a vehicle, and which rotatably supports the spool between a pair of leg pieces, and at which lock teeth are formed at an inner surface of an opening of each leg piece;
    a gear formed substantially as a disc whose diameter is larger than a diameter of one end surface of the spool, the gear being provided at an outer side of one of the leg pieces of the frame; and
    a lock plate having a pair of pawls formed so as to be engageable with the lock teeth, and a connecting shaft which has a circular cross-section and which connects the pair of pawls such that said shaft and pawls are formed in one piece, and due to the connecting shaft being inserted into and disposed in the cut-out portion so as to be pivotally movable therein, the pair of pawls are disposed so as to oppose the lock teeth at both end portions of the spool, and in a predetermined case, due to due to the pair of pawls engaging with the lock teeth, the lock plate impedes rotation of the spool in a webbing pull-out direction.

15. A webbing retractor according to claim 14, further comprising at least one sensor for controlling operation of the webbing retractor.

16. A webbing retractor according to claim 15, wherein the sensor is a webbing sensor, and the webbing sensor is accommodated within a holder provided at an outer side of one of the leg pieces of the frame.

17. A webbing retractor according to claim 16, further comprising an acceleration sensor, wherein the acceleration sensor is accommodated within a housing fixed to one portion of the holder of the webbing sensor.

18. A webbing retractor comprising:

a spool which is tube-shaped and on which a webbing is taken-up and from which the webbing is pulled-out;

a cut-out portion formed over substantially an entire length of an outer surface of the spool along a rotational axis of the spool, a bottom portion of the cut-out portion being circular-arc-shaped;

a frame which is fixed and held at a vehicle, and which rotatably supports the spool between a pair of leg pieces, and at which lock teeth are formed at an inner surface of an opening of each leg piece; and a lock plate having a pair of pawls formed so as to be engageable with the lock teeth, and a connecting shaft which has a circular cross-section and which connects the pair of pawls, and due to the connecting shaft being inserted into and disposed in the cut-out portion, the pair of pawls are disposed so as to oppose the lock teeth at both end portions of the spool, and in a predetermined case, due to due to the pair of pawls engaging with the lock teeth, the lock plate impedes rotation of the spool in a webbing pull-out direction, wherein, at the lock plate, the pair of pawls and the connecting shaft are formed integrally.

19. A webbing retractor according to claim 18, wherein the lock plate is integrally molded by die casting.

* * * * *